United States Patent
Zhang

(10) Patent No.: US 10,424,970 B2
(45) Date of Patent: *Sep. 24, 2019

(54) SOFT SWITCHED SINGLE STAGE WIRELESS POWER TRANSFER

(71) Applicant: Navitas Semiconductor, Inc., El Segundo, CA (US)

(72) Inventor: Ju Jason Zhang, Monterey Park, CA (US)

(73) Assignee: Navitas Semiconductor, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,173

(22) Filed: May 29, 2018

(65) Prior Publication Data

US 2019/0115788 A1    Apr. 18, 2019

Related U.S. Application Data

(63) Continuation of application No. 15/007,132, filed on Jan. 26, 2016, now Pat. No. 10,008,884, which is a
(Continued)

(51) Int. Cl.
*H02J 50/12* (2016.01)
*H02M 3/335* (2006.01)
*H02M 3/337* (2006.01)

(52) U.S. Cl.
CPC .............. *H02J 50/12* (2016.02); *H02M 3/335* (2013.01); *H02M 3/337* (2013.01); *Y02B 70/1433* (2013.01)

(58) Field of Classification Search
CPC . H02J 5/005; H02J 7/025; H02J 17/00; B60L 11/182
See application file for complete search history.

(56) References Cited

U.S. PATENT DOCUMENTS

| | | | |
|---|---|---|---|
| 4,814,962 A | * | 3/1989 | Magalhaes .......... H02M 3/3376 363/16 |
| 5,808,879 A | | 9/1998 | Liu et al. |

(Continued)

FOREIGN PATENT DOCUMENTS

| | | |
|---|---|---|
| CN | 101572490 A | 11/2009 |
| TW | 201618423 | 5/2016 |

(Continued)

OTHER PUBLICATIONS

First Action Interview Office Action Summary in U.S. Appl. No. 14/588,102, dated Jul. 30, 2015 in 4 pages (of-record in parent application).
(Continued)

*Primary Examiner* — Rexford N Barnie
*Assistant Examiner* — David A Shiao
(74) *Attorney, Agent, or Firm* — Kilpatrick Townsend & Stockton LLP

(57) ABSTRACT

A control scheme and architecture for a wireless electrical energy transmission circuit employs two solid-state switches and a zero voltage switching (ZVS) topology to power an antenna network. The switches drive the antenna network at its resonant frequency and simultaneously energize a separate resonant circuit that has a resonant frequency lower than the antenna circuit. The resonant circuit creates out of phase voltage and current waveforms that enable the switches to operate with (ZVS).

18 Claims, 12 Drawing Sheets

Related U.S. Application Data continuation of application No. 14/588,102, filed on Dec. 31, 2014, now Pat. No. 9,276,413.

(60) Provisional application No. 62/055,191, filed on Sep. 25, 2014.

(56) References Cited

U.S. PATENT DOCUMENTS

| | | | |
|---|---|---|---|
| 6,160,374 | A | 12/2000 | Hayes et al. |
| 6,621,183 | B1 | 9/2003 | Boys et al. |
| 6,934,167 | B2 | 8/2005 | Jang et al. |
| 9,276,413 | B1 | 3/2016 | Zhang |
| 2007/0222426 | A1 | 9/2007 | Waffenschmidt et al. |
| 2007/0252441 | A1* | 11/2007 | Yamauchi ............... H02J 5/005 307/104 |
| 2009/0290385 | A1 | 11/2009 | Jungreis et al. |
| 2010/0225173 | A1 | 9/2010 | Aoyama et al. |
| 2011/0254377 | A1 | 10/2011 | Wildmer et al. |
| 2012/0002446 | A1* | 1/2012 | Madawala ............... H02J 5/005 363/17 |
| 2012/0112532 | A1 | 5/2012 | Kesler et al. |
| 2013/0033118 | A1 | 2/2013 | Karalis et al. |
| 2013/0039099 | A1 | 2/2013 | Wu et al. |
| 2013/0082536 | A1 | 4/2013 | Taylor et al. |
| 2013/0300210 | A1 | 11/2013 | Hosotani |
| 2014/0086592 | A1 | 3/2014 | Nakahara et al. |
| 2014/0103738 | A1 | 4/2014 | Campanella et al. |
| 2014/0191568 | A1 | 7/2014 | Partovi |
| 2014/0225439 | A1 | 8/2014 | Mao |
| 2014/0333150 | A1 | 11/2014 | Iwawaki |
| 2015/0015081 | A1 | 1/2015 | Usami |
| 2015/0015197 | A1 | 1/2015 | Mi et al. |
| 2015/0054349 | A1 | 2/2015 | Ishikuro et al. |
| 2015/0061577 | A1 | 3/2015 | Ye et al. |
| 2015/0069855 | A1 | 3/2015 | De Rooij et al. |
| 2015/0076921 | A1* | 3/2015 | Park ....................... H02J 50/12 307/104 |
| 2015/0180266 | A1 | 6/2015 | Mcfarthing |
| 2015/0333801 | A1* | 11/2015 | Hosotani ............... H01F 38/14 307/104 |
| 2016/0134131 | A1 | 5/2016 | Murayama |
| 2016/0164346 | A1 | 6/2016 | Zhang |
| 2017/0005527 | A1 | 1/2017 | Ishihara |
| 2017/0040844 | A1 | 2/2017 | Su |
| 2017/0250573 | A1 | 8/2017 | Olyunin et al. |

FOREIGN PATENT DOCUMENTS

| | | |
|---|---|---|
| WO | 2016049372 | 3/2016 |
| WO | 2016049372 A1 | 3/2016 |

OTHER PUBLICATIONS

Notice of Allowance in U.S. Appl. No. 14/588,102, dated Nov. 6, 2015 in 11 pages (of-record in parent application).

Preinterview First Office Action in U.S. Appl. No. 14/588,102, dated Jun. 19, 2015 in 5 pages (of-record in parent application).

Non-Final Office Action in U.S. Appl. No. 15/007,132, dated Oct. 6, 2017 in 27 pages (of-record in parent application).

Notice of Allowance in U.S. Appl. No. 15/007,132, dated Mar. 7, 2018 in 12 pages (of-record in parent application).

International Preliminary Report on Patentability in PCT Application No. PCT/US2015/052052, dated Jan. 27, 2016 in 10 pages (of-record in parent application).

International Search Report and Written Opinion in PCT Application No. PCT/US2015/052052, dated Jan. 27, 2016 in 13 pages (of-record in parent application).

Notice of Decision to Grant in Taiwan Application No. TW104131925, dated Apr. 2, 2018 in 3 pages (of-record in parent application).

Office Action in Taiwan Application No. TW104131925, dated Dec. 4, 2017 in 3 pages (of-record in parent application).

TW Application No. 107115717 Decision of Grant, dated Oct. 2, 2018; 6 pages.

* cited by examiner

SOFT SWITCHED SINGLE STAGE WIRELESS POWER TRANSFER

CROSS-REFERENCES TO RELATED APPLICATIONS

This application is a continuation of U.S. patent application Ser. No. 15/007,132, filed Jan. 26, 2016, titled "SOFT SWITCHED SINGLE STAGE WIRELESS TRANSFER" which is a continuation of U.S. patent application Ser. No. 14/588,102 filed Dec. 31, 2014 patented as U.S. Pat. No. 9,276,413 issued Mar. 1, 2016, titled "SOFT SWITCHED SINGLE STAGE WIRELESS POWER TRANSFER" that claims priority to Provisional Application No. 62/055,191 filed Sep. 25, 2014 titled "SOFT SWITCHED SINGLE STAGE WIRELESS TRANSFER", which are hereby incorporated by reference in their entirety for all purposes.

FIELD

The present invention relates generally to wireless power transfer circuits and in particular to the wireless power transfer utilizing an antenna, resonator or resonant tank network.

BACKGROUND

Wireless energy transmission refers to technologies that transmit electrical energy from a power source to a separate device, such as a cell phone or laptop computer without cables or conductors. Two architectures that are widely used for wireless power transfer are antennas (i.e., antenna-based near-field resonator) and inductive coupling. Antenna-based resonant systems offer better efficiency and greater power transfer distances than inductive coupling based technologies. The antenna coil typically has a narrow operating range in terms of drive voltage, typically 5-40V depending on the power level and coil design.

Wireless power transmitters typically drive the antenna with a two stage power converter. The first stage rectifies the AC mains to an intermediate low voltage DC bus (5-40V). The second stage is an inverter that converts the intermediate low voltage DC bus voltage to AC that excites the antenna coil. These power conversion architectures are complex, costly and inefficient.

SUMMARY

In one embodiment a wireless power transmission circuit is disclosed. The circuit includes a voltage source having first and second output terminals that supplies the circuit with power. The circuit further includes a first solid-state switch having a pair of first power terminals and a first gate terminal. The pair of first power terminals are connected between the first output terminal of the voltage source and a switch node connection. A second solid-state switch has a pair of second power terminals and a second gate terminal. The pair of second power terminals are connected between the switch node and the second output terminal of the voltage source.

The circuit further includes an antenna network coupled to the switch node and configured to transmit electrical energy at a first frequency. A resonant circuit is coupled to the switch node and configured to resonate at a second frequency that is lower than the first frequency. A controller is coupled to the first and the second gate terminals and is configured to operate the first and the second solid-state switches such that they regulate power from the voltage source to drive the antenna network at the first frequency. The first frequency interacts with the resonant circuit creating out of phase voltage and current signals at the switch node. The out of phase signals enable the first and the second solid-state switches to operate with zero voltage switching.

In further embodiments the resonant circuit includes a capacitor and an inductor. In yet further embodiments the first and the second solid-state switches are GaN-based field-effect transistors. In one embodiment the voltage source supplies a voltage of 400 volts or greater at the first and the second output terminals. In some embodiments the first frequency is 5 MHz or greater.

In one embodiment the first solid-state switch is turned on by the controller after the first pair of power terminals have approximately 0 volts across them and in another embodiment the controller will not turn on unless the output capacitance (Coss) of the first solid-state switch is discharged. Some circuits may employ a voltage divider to reduce an input voltage supplied to the antenna network. In further embodiments the antenna network is configured to resonate at the first frequency.

In some embodiments the circuit may further include a third solid-state switch having a pair of third power terminals and a third gate terminal. The pair of third power terminals are connected between the first output terminal and a second switch node. The circuit may further have a fourth solid-state switch having a pair of fourth power terminals and a fourth gate terminal. The pair of fourth power terminals are connected between the second switch node and the second output terminal. The antenna network and the resonant circuit are connected between the switch node and the second switch node. The controller is coupled to the third and the fourth gate terminals such that it can drive all four switches.

In yet further embodiments the circuit may further comprise a second resonant circuit disposed between the switch node and the second switch node, connected in parallel with the resonant circuit. In some embodiments the circuit may include a second resonant circuit coupled in parallel with the second switch and connected between the switch node and the second output terminal; and a third resonant circuit coupled in parallel with the fourth switch and connected between the second switch node and the second output terminal.

Further embodiments include a method of operating a wireless power transmission circuit. The method includes supplying power to the circuit with a voltage source having a first and a second output terminal. A first gate control signal is transmitted to a first driver circuit. In response, the first driver circuit transmits a first gate drive signal to a gate of a first solid-state switch. The first solid-state switch has a pair of first power terminals connected between the first output terminal and a switch node. A second gate control signal is transmitted to a second driver circuit. In response, the second driver circuit transmits a second gate drive signal to a gate of a second solid-state switch.

The second solid-state switch has a pair of second power terminals connected between the second output terminal and the switch node. A controller transmits the first and the second gate control signals such that the first and second solid-state switches turn on and off at a first frequency, regulating power delivered to the switch node. An antenna network is coupled to the switch node and driven at the first frequency such that electrical energy is radiated from the antenna. A resonant circuit is coupled to the switch node and energized with the first frequency such that out of phase voltage and current signals are created. The out of phase signals enable the first and the second solid-state switches to operate with zero voltage switching.

In some embodiments a wireless power receiver circuit includes a rectifier circuit having first and second input terminals and first and second output terminals. The rectifier circuit further includes a first leg connected between the first input terminal and the first output terminal, a second leg connected between the first output terminal and the second input terminal, a third leg connected between the first input terminal and the second output terminal, a fourth leg connected between the second output terminal and the second input terminal, and at least one switch disposed within at least one of the first, the second, the third and the fourth legs. The receiver circuit also includes a receiver coil having a first terminal connected to the first input terminal and a second terminal connected to the second input terminal. A controller is coupled to the at least one switch and is configured to control output power of the wireless power receiver circuit.

In further embodiments two or more switches may be disposed within at least one of the first, the second, the third and the fourth legs and controlled with the controller. In yet further embodiments, one of the at least one switches may be GaN-based.

In some embodiments a method of operating a wireless power receiver circuit may include receiving AC power with a receiver coil. The receiver coil has first and second receiver terminals connected to first and second input terminals, respectively, of a rectifier circuit. The rectifier circuit may be used to rectify the received AC power and may include a first leg connected between the first input terminal and a first output terminal, a second leg connected between the first output terminal and the second input terminal, a third leg connected between the first input terminal and a second output terminal, a fourth leg connected between the second output terminal and the second input terminal, and at least one switch disposed within at least one of the first, the second, the third and the fourth legs. The rectifier circuit is used to regulate DC power at the first and second output terminals by operating the at least one switch with a controller.

In further embodiments two or more switches may be disposed within at least one of the first, the second, the third and the fourth legs and controlled with the controller. In yet further embodiments, one of the at least one switches may be GaN-based.

DETAILED DESCRIPTION

Certain embodiments of the present invention relate to antenna drive networks for wireless electrical energy transmitters. While the present invention can be useful for a wide variety of antenna drive networks, some embodiments of the invention are particularly useful for antenna drive networks that use single-stage power conversion and/or zero voltage switching (ZVS), as described in more detail below.

Many electronic devices such as smart-phones, media players, and tablet computers are rechargeable and require charging of a battery to operate without a power cord. Some electronic devices may be configured to be charged with a wireless electrical energy transfer system. Wireless electrical energy transfer systems typically consist of a power transmitter that transmits electrical energy through the air to a receiver located within the electronic device. The power transmitter may receive power from AC mains to power an antenna drive network that in turn powers the transmitter's antenna. The antenna wirelessly transmits electrical energy to a receiver within the device. The receiver then converts the energy to a usable form and supplies it to the device.

Figure 1:
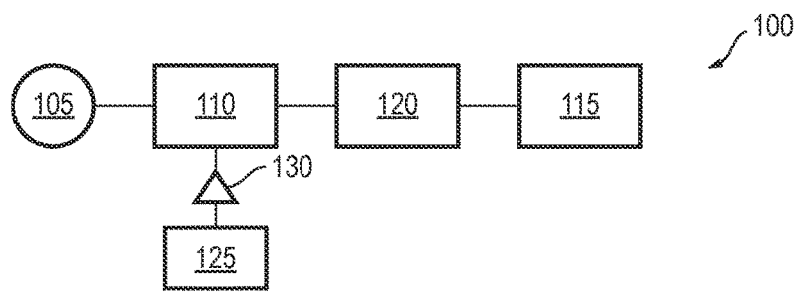
FIG. 1 is a schematic of a simplified single-stage antenna drive network circuit in accordance with an embodiment of the invention.

Now referring to FIG. 1, a simplified block diagram of an embodiment of a single stage antenna drive system 100 is illustrated. A power source 105 may be used to supply power to a power regulator 110. Power regulator 110 may comprise one or more solid-state switches, among other active and passive devices, and be configured to drive antenna network 115 at a first frequency. The first frequency may interact with resonant circuit 120 creating out of phase voltage and current signals at power regulator 110. The out of phase voltage and current signals may be used to enable ZVS of the one or more solid-state switches in power regulator 110, as discussed in more detail below. Controller 125 may control the operation of the one or more solid-state switches in power regulator 110 through driver circuit 130.

Figure 2:
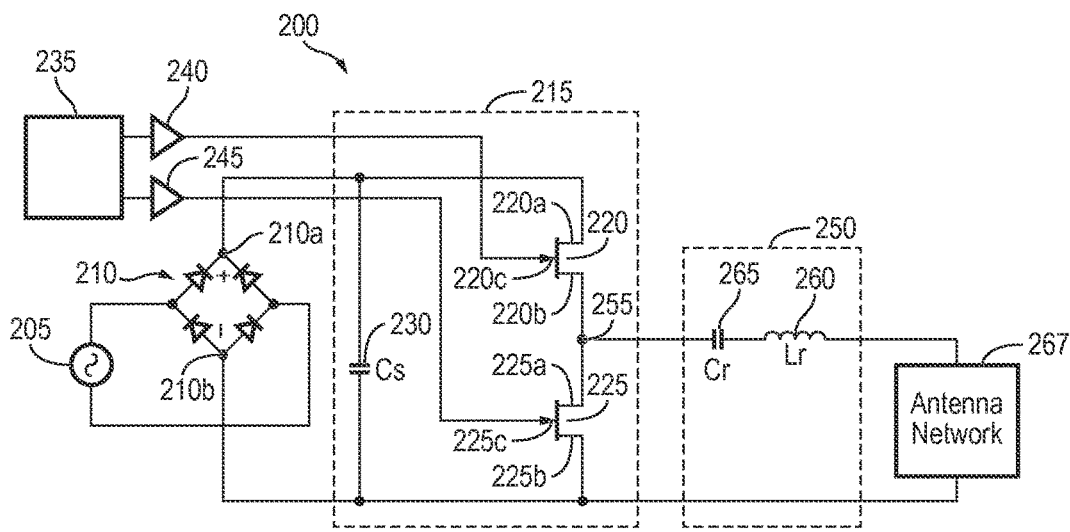
FIG. 2 is schematic of a simplified single-stage antenna drive network circuit including a controller and FET drivers in accordance with an embodiment of the invention.

Now referring to FIG. 2, one embodiment of a simplified single-stage antenna drive network 200 is illustrated. This embodiment is powered by an AC mains source 205 that is connected to full-wave rectifier 210. Rectifier 210 converts AC from AC mains source 205 to a DC source having cyclical voltage variations at approximately twice the frequency of the AC mains source. A smoothing capacitor 230 may be used to smooth the cyclical voltage variations, creating a relatively steady high voltage DC power source.

DC power is delivered to half-bridge power regulator 215 through first output terminal 210a and second output terminal 210b.

Power regulator 215 comprises first switch 220, second switch 225 and smoothing capacitor 230. First switch 220 has a pair of first power terminals 220a, 220b connected between the first output terminal 210a and a switch node 255. Second switch 225 has a pair of second power terminals 225a, 225b connected between the switch node 255 and second output terminal 210b. Power regulator 215 is controlled by controller 235 that operates first and second switches 220, 225, respectively, through first driver circuit 240 and second driver circuit 245.

First driver circuit 240 is connected to first gate 220c of first switch 220. Second driver circuit 245 is connected to second gate 225c of second switch 225. Controller 235 operates first and second switches 220, 225, respectively, at a first frequency that may be called the switching frequency or (fsw). Resonant circuit 250 is coupled to power regulator 215 and has a resonant frequency (f0) at a second frequency that is lower than the first frequency (fsw). In some embodiments, resonant circuit 250 may include an inductor 260 and a capacitor 265, however other embodiments may comprise different components. The interaction of the first frequency (fsw) with resonant circuit 250 may create out of phase voltage and current signals at switch node 255 that enable first and second switches, 220, 225, respectively, to operate using ZVS, as described in more detail below.

Antenna network 267 is coupled to switch node 255 of power regulator 215 through resonant circuit 250. Thus, first and second switches 220, 225, respectively, may be switched to regulate power delivered to antenna network 267 and/or to drive the antenna network with the appropriate AC frequency, which may be the antenna network's resonant frequency. As illustrated, single-stage antenna drive network 200 may power antenna network 267 without using an intermediate low voltage DC bus.

As used herein, ZVS means that the semiconductor switch may be turned on or off only when the voltage applied across the switch is at or near zero (i.e., zero voltage switching or ZVS) and when the output capacitance, or Coss, is at or near zero charge. Switching losses (i.e., turning a switch off while it is conducting current or turning a switch on when it has a voltage potential across it) may be a significant contributor to power loss in the system. The use of ZVS may result in reduced switching losses, increased frequency of operation and in some embodiments, reduced electromagnetic interference (EMI) generation.

Figure 3A:
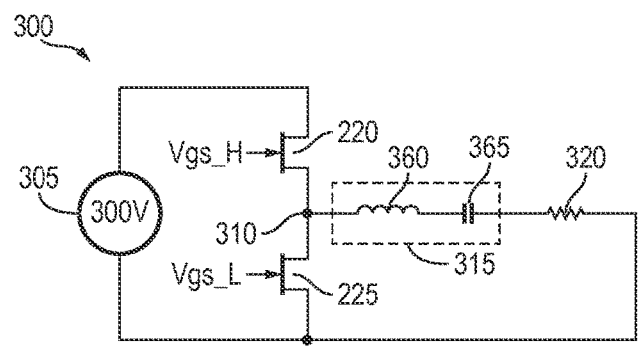
FIG. 3A is schematic of a simplified single-stage antenna drive network circuit in accordance with an embodiment of the invention.

Now referring to FIG. 3A, an example half bridge circuit 300 is illustrated along with selected voltage and current plots (FIGS. 3B-3E) to show how a resonant circuit may create out of phase voltage and current signals enabling ZVS. Circuit 300 has a DC voltage source 305 at 300 VDC. First switch 220 is also known as a "High Side" switch and is controlled by a gate signal Vgs_H. Second switch 225 is also known as a "Low Side" switch and is controlled by a gate signal Vgs_L. First and second switches 220, 225, respectively, are coupled to switch node 310 and control power delivered to resonant circuit 315 and a load represented by resistor 320. In some embodiments resistor 320 may be an antenna network.

In this embodiment the switching frequency of first and second switches 220, 225, respectively is above a resonant frequency of resonant circuit 315. In this example, the resonant frequency of resonant circuit 315 may be 2 MHz and first and second switches 220, 225, respectively, may operate at a switching frequency of approximately 5 MHz. Other embodiments may operate at different resonant and switching frequencies.

Figure 3B:
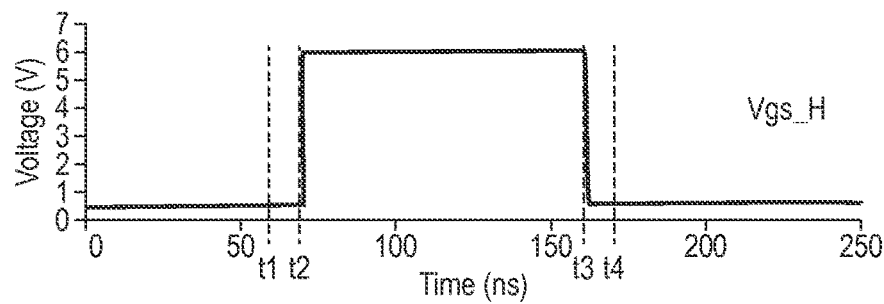
FIG. 3B is an example voltage plot of the gate drive voltage of the high side FET in the circuit illustrated FIG. 3A according to an embodiment of the invention.
Figure 3C:
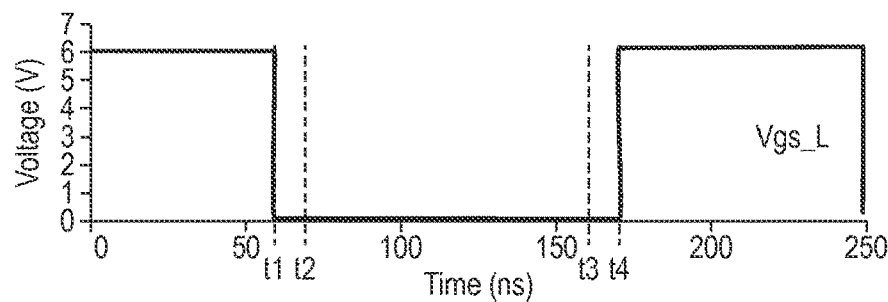
FIG. 3C is an example voltage plot of the gate drive voltage of the low side FET in the circuit illustrated in FIG. 3A according to an embodiment of the invention.
Figure 3D:
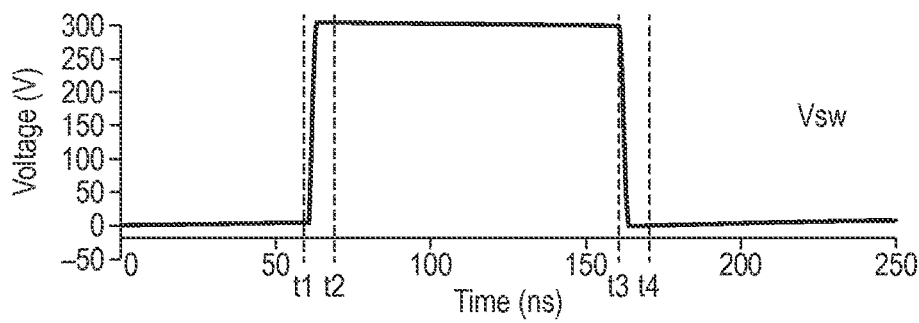
FIG. 3D is an example voltage plot of the switch-node voltage of the circuit illustrated in FIG. 3A according to an embodiment of the invention.
Figure 3E:
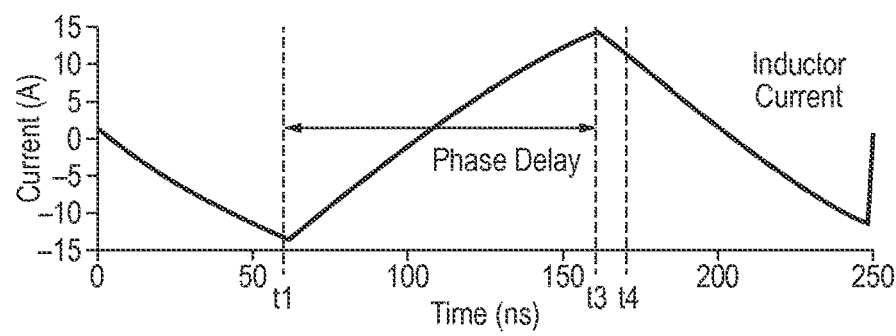
FIG. 3E is an example current plot of the inductor current in the circuit illustrated in FIG. 3A according to an embodiment of the invention.

Now referring simultaneously to FIGS. 3A-3E, selected voltage and current waveforms of circuit 300 are plotted during a representative switching cycle. As illustrated in FIGS. 3D and 3E, current in inductor 360 lags the voltage at switch node 310. That is, the current in inductor 360 (see FIG. 3E) reaches peak current later than the voltage at switch node 310 (see FIG. 3D) reaches peak voltage. Thus circuit 300 may be called "inductive". In embodiments that employ ZVS, the lagging current in an "inductive" circuit may be used to provide energy to discharge output capacitance (Coss) of the first and second switches 220, 225, respectively before they turn on, as discussed in more detail below.

FIG. 3C plots the gate voltage of second switch 225. At time t1, second switch 225 turns off (i.e., its gate voltage transitions from 6 volts to 0 volts). As illustrated in FIG. 3B, first switch 220 is also off at time t1. This state causes a negative current in inductor 360 that discharges the output capacitor (Coss) in first switch 220. As illustrated in FIG. 3D, after time t1 the voltage at switch node 310 rises quickly to the voltage of source 305 (i.e., 300 volts). Once switch node 310 is at the voltage of source 305 there is zero voltage potential across first switch 220 since both terminals of the first switch are at Vin, (i.e., 300V). Thus, ZVS of first switch 220 may be achieved since it now has 0 volts across it and its output capacitance (Coss) has been discharged.

Now referring to FIG. 3B, at time t2, first switch 220 turns on with ZVS (i.e., its gate voltage transitions from 0 volts to 6 volts). Simultaneously at time t2, FIG. 3E shows current in inductor 360 increasing towards a peak current. Now referring to FIG. 3B, at time t3 first switch 220 is turned off (i.e, its gate voltage transitions from 6 volts to 0 volts). Positive current in inductor 360 discharges the output capacitance (Coss) of second switch 225. Simultaneously, at time t3, FIG. 3D shows the voltage at switch node 320 decreasing to 0 volts. When switch node 320 voltage reaches 0 volts, the voltage across second switch 225 is zero. Thus, ZVS of second switch 225 may be achieved since it now has 0 volts across it and its output capacitance (Coss) has been discharged. Now referring to FIG. 3C, at time t4, second switch 225 turns on with ZVS (i.e., its gate voltage transitions from 0 volts to 6 volts).

In some embodiments that use ZVS the resonant frequency of resonant circuit 315 may be between 10% and 60% lower than the switching frequency. In such embodiments, first and second switches 220, 225, respectively, may inject a square voltage waveform into resonant circuit 315, at node 310. A square voltage waveform at the switching frequency (fsw) may have many harmonic frequencies such as 2fw, 3fsw, 4fsw, etc. that cause the antenna to transmit related harmonic frequencies. In some embodiments, it may not be desirable for the antenna to transmit harmonic frequencies due to communication regulations that require a transmitter to transmit in a narrowly defined bandwidth. Thus, in some embodiments it may be desirable to pass the switching frequency (fsw) to the antenna with minimal harmonics.

When operating at a switching frequency closer to the resonant frequency of 315, the voltage and current waveforms going through capacitor 365 and inductor 360 may be more sinusoidal, as the network has a high quality factor that serves as a filter. In these embodiments, the square wave waveform may be filtered through 315 and the voltage waveform applied to antenna network 267 (see FIG. 2) winding is also more sinusoidal. This may help reduce the injection of harmonic frequencies into antenna network 267 (see FIG. 2), improving the performance of the antenna network and assist in meeting regulatory requirements such as electromagnetic compliance standards.

In further embodiments, the resonant frequency of resonant circuit 315 may be much lower than the switching frequency. For example, in some embodiments the resonant frequency of resonant circuit 315 may be between 50% to 90% lower than the switching frequency. In these embodiments, resonant circuit 315 may resemble a low pass filter without any, or with little resonant action between Lr and Cr, and ZVS may be achieved for a wide range of load conditions. In these embodiments, the waveform applied to the antenna network may have a more triangular current shape (see FIG. 3E). Since this waveform is not a pure sinusoidal waveform, it too will create harmonics that will be transmitted by the antenna. In such embodiments an additional filter may be employed in front of antenna network 267 (see FIG. 2), to remove the harmonic content.

Other embodiments may employ ZCS switching such that each switch may turn off when its drain current reduces to zero. In embodiments that employ ZCS circuit architectures, the current leads the voltage signal, which may also be called "being capacitive" and may be achieved by using Lr and Cr values that resonate at a higher frequency than the switching frequency. ZCS reduces turn-off switching loss, which may be a significant energy loss component at high frequency or at high voltage. A similar series resonant circuit (i.e., such as resonant circuit 315) may be used achieve ZCS. In some embodiments, certain types of switches, such as, for example IGBTs may be particularly, useful for ZCS switches due to their long current tail during switching transitions.

In further embodiments it may be beneficial for the switches to be able to withstand high voltage potentials and to switch at high frequencies, particularly when the transmitter runs off AC mains. In one embodiment the voltage potential across the switches may be in the range of 50-1000 VDC and in another embodiment in the range of 100-400 VDC. In other embodiments the switching frequency may be in the range of 1-20 MHz while yet further embodiments may operate in a range between 5-14 MHz. In one embodiment the switching frequency may be 6.78 MHz.

In some embodiments, one or more of the switches may be a silicon-based MOSFET device. In further embodiments one or more of the switches may be a GaN-based device. In one such embodiment one or more of the devices may be fabricated on a substrate having a base of silicon with an epitaxially deposited layer of GaN. In other embodiments different substrate configurations may be employed.

As discussed in more detail below, GaN-based switches may be particularly useful in embodiments that may be used to efficiently switch high voltage buses (e.g., 400V and above) and/or at high frequencies (e.g., 5-14 MHz). However, none of the embodiments herein shall be limited in scope to any particular type of switch. All embodiments may use silicon-based, GaN-based, or a combination thereof for any solid-state switch. In some embodiments the efficiency of the antenna drive network may be in the range of 70% to 95%. In one embodiment the efficiency of the antenna drive network may be approximately 90%.

In some embodiments, GaN based switches may be particularly well suited to switch at high frequencies due to their lower output capacitance, or Coss values, their relatively fast switching speed and their lower gate charge requirements. Each time the FET turns on, the energy stored in the output capacitance will be dissipated in the device. As the switching frequency increases, the power dissipation in the FET due to discharging this energy increases proportionately, which may become a limiting factor in hard switching topologies. Thus, because GaN-bases switches have a lower Coss value than silicon, they can operate at higher frequencies with less power dissipation.

Further, silicon-based devices have a body diode that is made from a P-N junction. When the diode conducts it needs time for charge recovery or it won't be able to block a reverse voltage. As a general rule, the higher the voltage the longer the recovery time for the body diode. For example, at frequencies in the 100 kHz range the diode needs to recover within about 1 microsecond. However, for example, at frequencies in the 6 MHz range, the diode needs to recover within approximately 30 nanoseconds, but it can't. Therefore, because GaN switches do not have an internal body diode that needs to recover, they can switch faster. Moreover, since GaN-based switches have lower gate charge and lower Coss than silicon-based switches, it is easier to recover energy since there is less energy to recover and it takes less time to recover it.

As a non-limiting example, in some embodiments the relatively small Coss associated with GaN devices, on the order of 2 picofarads, may enable faster discharging of the Coss and thus higher switching frequencies. As a further non-limiting example, in some embodiments GaN-based switches may switch within approximately 2 nanoseconds, enabling them to operate at high frequencies.

Further, GaN-based devices may be operated with relatively small driver circuits, even at high voltages, because of their relatively small gate charge requirements. The smaller charge requirements may make the reduced size and cost of the driver circuit attractive for high voltage applications. Yet further, since GaN switches have a lateral construction, and the driver circuit may be relatively small, some embodiments may benefit from integrating the driver circuit monolithically or co-packaged with one or more of the FETs, as discussed in more detail below.

Figure 4:
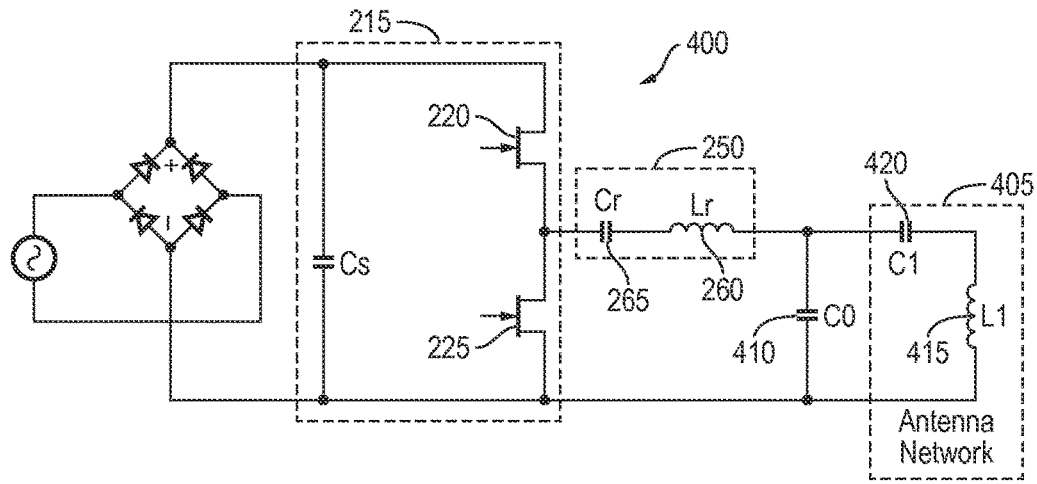
FIG. 4 is a schematic of a simplified single-stage antenna drive circuit with a resonant circuit according to an embodiment of the invention.

Now referring to FIG. 4 an embodiment of a simplified single-stage antenna drive network 400 attached to an antenna network 405 is illustrated. The circuit in FIG. 4 is similar to the circuit in FIG. 2, however antenna network 405 has been added, along with a capacitor 410 which is employed as a voltage divider, as discussed in more detail below.

In some embodiments antenna network 405 may have its own inductor 420 and capacitor 420 forming a resonant antenna circuit. In further embodiments, power regulator 215 may operate at a switching frequency matched to the antenna network 405 resonant frequency such that the antenna network transmits energy for wireless charging. Power regulator 215 may simultaneously energize resonant circuit 250 such that it resonates at a different frequency from the switching frequency creating out of phase voltage and current signals that enable first and second switches, 220, 225, respectively, to operate using ZVS. As discussed above, in one embodiment, resonant circuit 250 may be designed to operate at a frequency below the switching frequency and first and second switches, 220, 225, respectively, operate with ZVS. In another embodiment, resonant circuit 250 may be designed to operate at a frequency above the switching frequency and first and second switches, 220, 225, respectively, operate with ZCS.

In further embodiments a voltage divider circuit may be used to adjust the voltage applied to antenna network 405. In FIG. 4 a capacitive voltage divider circuit is used were the ratios between capacitor 265 and capacitor 410 determine the voltage applied to antenna network 405. More specifically capacitor 410 may be used to reduce the AC voltage from capacitor 265 to match the requirements of antenna network 405. In some embodiments capacitor 410 may be larger than capacitor 265. The ratio between capacitors 265 and 410 can be selected such that the resulting voltage across capacitor 410 matches the voltage requirement for antenna network 405. In one embodiment capacitor 410 is selected that is five times bigger than capacitor 265 and the AC voltage supplied to antenna network 405 is reduced from +/−100V to +/−20V. In other embodiments a different type of voltage divider circuit or technique to reduce the voltage applied to antenna network 405 may be used without departing from the invention.

Figure 5:
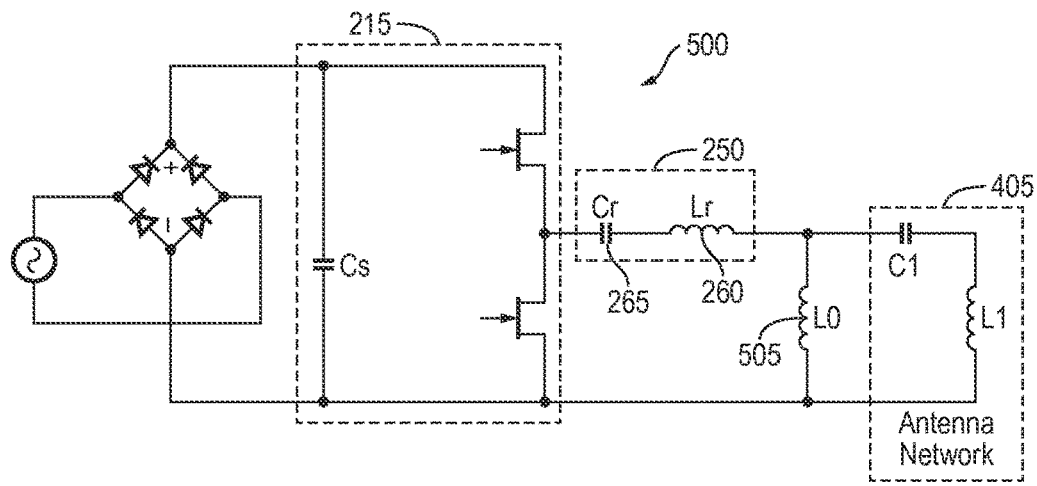
FIG. 5 is a schematic of a simplified single-stage antenna drive circuit with a resonant circuit and a voltage divider according to an embodiment of the invention.

Now referring to FIG. 5, circuit 500 is similar to circuit 400 illustrated in FIG. 4, however instead of using a capacitive voltage divider circuit, circuit 500 uses an inductive voltage divider circuit. More specifically, the ratio between inductor 260 and inductor 505 determines the voltage applied to antenna network 405. Thus, inductor 505 may be used to reduce the AC voltage from inductor 260 to match the requirements of antenna network 405. For example, if inductor 505 is ten times smaller than inductor 260, the voltage across capacitor 505 would be approximately ten times smaller than voltage across inductor 260. Myriad methods may be used to adjust the voltage to meet the requirements of antenna network 405 without departing from the invention.

Figure 6:
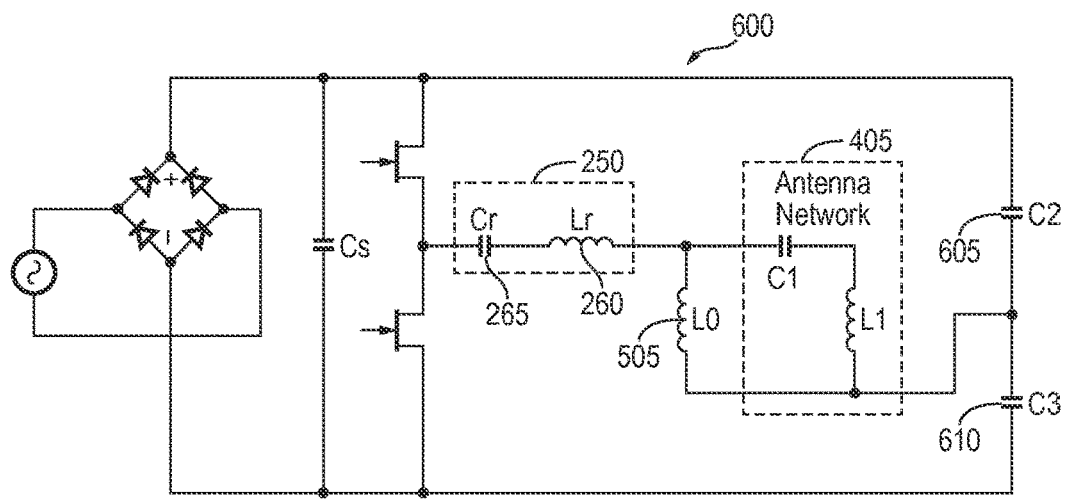
FIG. 6 is a schematic of a simplified single-stage antenna drive circuit with a resonant circuit and a voltage divider according to an embodiment of the invention.

Now referring to FIG. 6, circuit 600 is similar to circuit 500 illustrated in FIG. 5, however, where capacitor 265 (in FIG. 5) is blocking the DC voltage of the input bus, circuit 600 in FIG. 6 uses two capacitors (605, 610) to divide the input voltage so that antenna network 405 is supplied with half the input voltage. In some embodiments, capacitors 605, 610 may make it easier for a start-up circuit to power antenna network 405. Some embodiments without capacitors 605, 610 may have to turn on the PWM duty cycle gradually to properly power antenna network 405. The remainder of circuit 600 is the same as discussed with regard to circuit 500 illustrated in FIG. 5, including using inductors 260 and 505 to reduce the voltage applied to antenna network 405.

Figure 7:
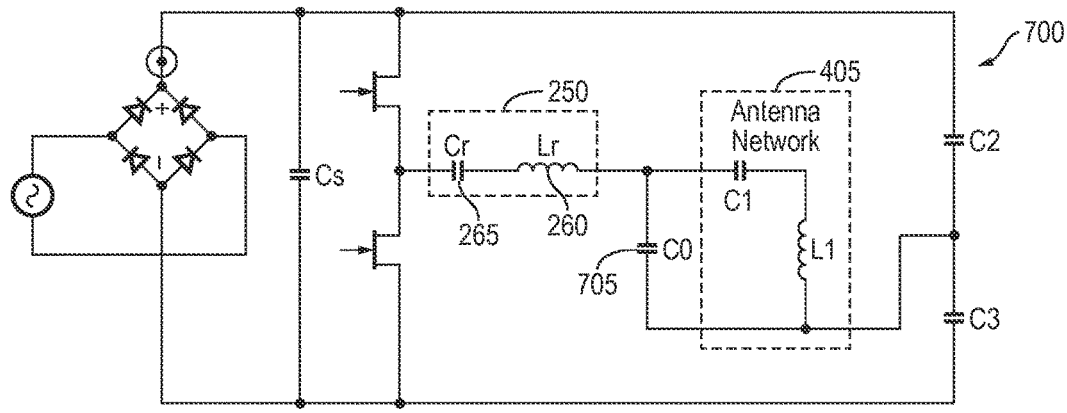
FIG. 7 is a schematic of a simplified single-stage antenna drive circuit with a resonant circuit and a voltage divider according to an embodiment of the invention.

Now referring to FIG. 7, circuit 700 is similar to circuit 600 illustrated in FIG. 6, however, instead of using an inductive voltage divider, circuit 700 uses two capacitors (265, 705) to adjust the input voltage to antenna network 405.

Figure 8:
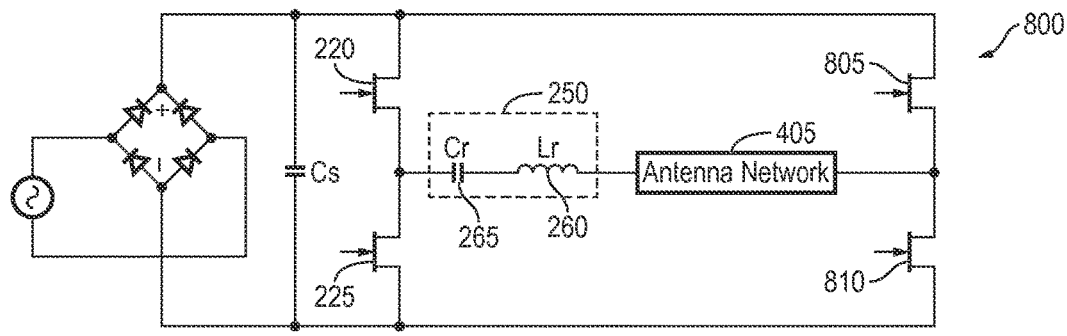
FIG. 8 is a schematic of a simplified full-bridge single-stage antenna drive circuit with a resonant circuit according to an embodiment of the invention.

Now referring to FIG. 8, circuit 800 illustrates a full-bridge circuit that may be used in some embodiments to convert a high voltage to a low voltage for antenna network 405. Full-bridge circuit 800 may be considered an extension of the half-bridge circuits discussed in the embodiments above (FIGS. 2, 3A, 4-7), however a third switch 805 and a fourth switch 810 may extend the power level such that the full bus voltage is applied to resonant circuit 250. More specifically, the half-bridge embodiments described above (FIGS. 2, 3A, 4-7) may apply only 50 percent of the bus voltage to the resonant circuit whereas full bridge 800 may apply 100 percent of the bus voltage. In some embodiments the lower the bus voltage that is supplied to resonant circuit, the more difficult the duty cycle is to control, which may be alleviated by adding a pre-regulator. Similar to the embodiments described above, in one embodiment, inductor 260 and capacitor 265 of resonant circuit 250 may be tuned to achieve ZVS for first, second, third and fourth switches, 220, 225, 805, 810, respectively. In further embodiments antenna network 405 may be tuned to the switching frequency of the full-bridge circuit to maximize power transfer. In some embodiments, as discussed above, matching components such as inductor 505 in FIG. 6 or capacitor 705 in FIG. 7 may be used to adjust the match of the circuit to antenna network 405.

Figure 9A:
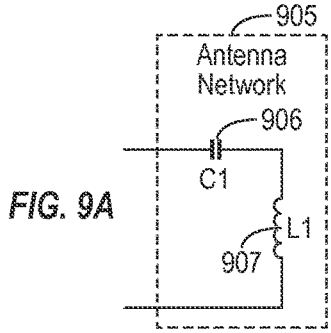
FIGS. 9A-9C are schematics of various antenna network configurations according to embodiments of the invention.
Figure 9B:
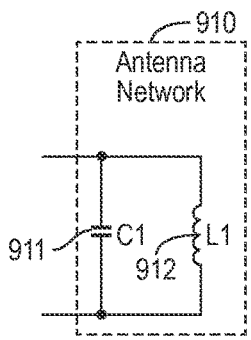
Figure 9C:
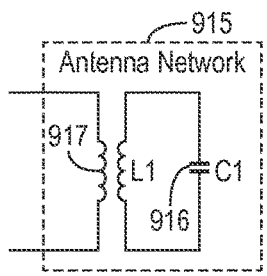

Now referring to FIGS. 9A-9C, various antenna network configurations (905, 910, 915) are illustrated. Any of these antenna networks may be used in place of antenna network 405 discussed in FIGS. 1-8 above, or in other embodiments. Antenna network 905 in FIG. 9A has a capacitor 906 and an inductor 907 in series. Network 905 may be particularly useful in embodiments that have an AC voltage source applied to the antenna network. Antenna network 910 in FIG. 9B has a capacitor 911 and an inductor 912 connected in parallel. Network 910 may be particularly useful when an AC current source is fed into the antenna network. Antenna network 915 in FIG. 9C may have a capacitor 916 connected in series with a transformer 917. Network 915 may use transformer 917 to translate AC voltage to match the antenna network impedance. Myriad antenna networks are within the scope of this disclosure and may be used without departing from the invention.

Figure 10:
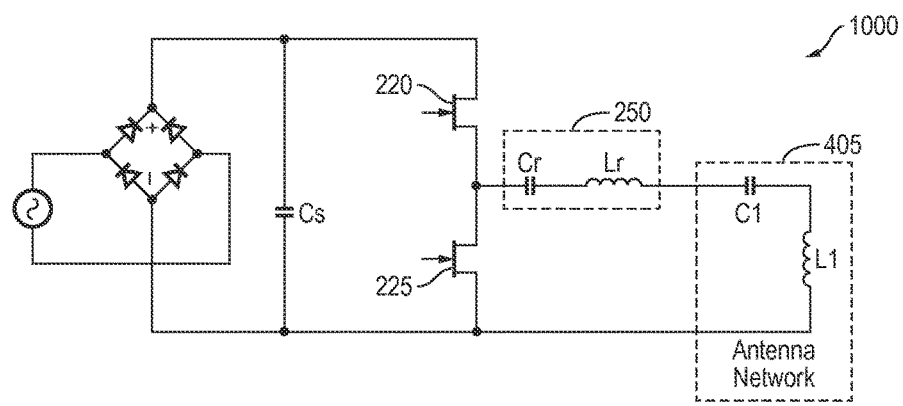
FIG. 10 is a schematic of a simplified single-stage antenna drive network circuit that uses an AC current source in accordance with an embodiment of the invention.

Now referring to FIG. 10, circuit 1000 illustrates a resonant half-bridge circuit that may be used in some embodiments to convert a high voltage to a low voltage for an antenna network 405. Circuit 1000 is similar to those described above, however instead of feeding AC voltage to antenna network 405, AC current is fed into the antenna network. In some embodiments, resonant circuit 250 is tuned to such that first and second switches 220, 225, respectively are operated using ZVS.

Figure 11:
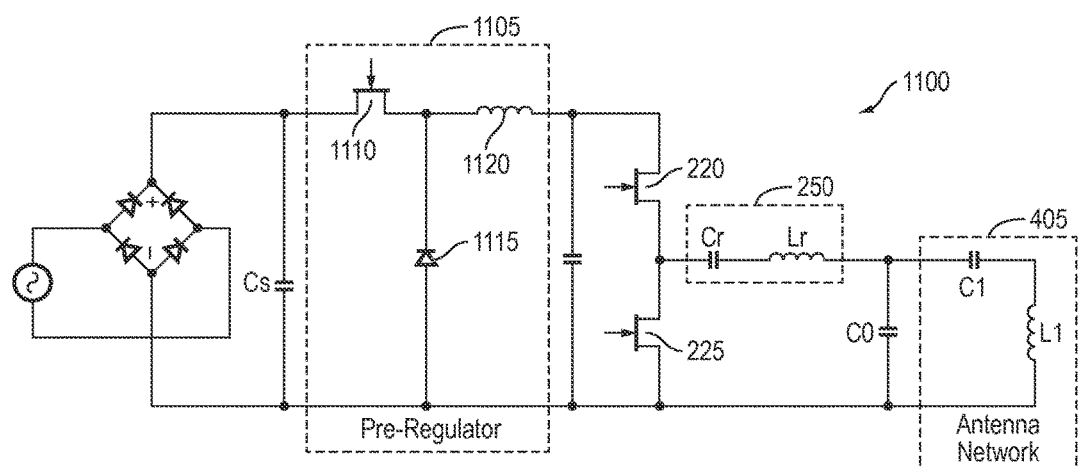
FIG. 11 is a schematic of a simplified single-stage antenna drive network circuit including a pre-regulator according to an embodiment of the invention.

Now referring to circuit 1100 in FIG. 11, an embodiment including a pre-regulator 1105 to remove AC ripple and/or to modulate antenna network 405 output power is illustrated. As compared to the embodiments above that all use single-stage power conversion, this embodiment employs pre-regulator 1105 which may add flexibility in regulating the amount of power transfer. In one embodiment, pre-regulator 1105 may include a pre-regulator switch 1110, a diode 1115 and an inductor 1120. Other embodiments may have different components and configurations. In some embodiments pre-regulation may be achieved by modulating the DC voltage for the inverter circuit. In further embodiments, DC/DC pre-regulator 1105 may be used to step down the voltage to remove line frequency ripples and modulate the DC voltage fed into the antenna driver to control the wireless power transfer. Such embodiments may decrease efficiency and increase the cost of the power regulator.

Figure 12:
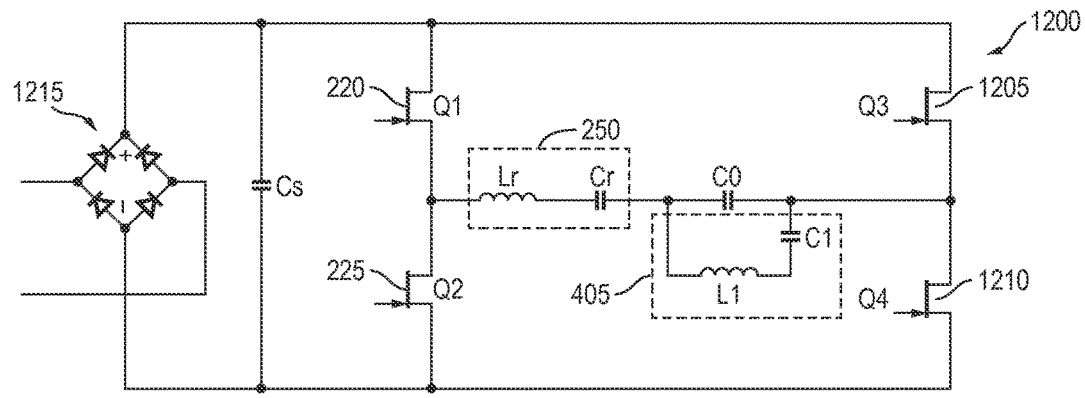
FIG. 12 is a schematic of a simplified single-stage antenna drive network circuit that uses a duty cycle algorithm to regulate the average wireless transmitter output power according to an embodiment of the invention.

Now referring circuit 1200 in FIG. 12, another embodiment may employ a circuit architecture having a duty cycle algorithm to regulate the average wireless transmitter output power from antenna network 405. In this embodiment, third and fourth switches 1205, 1210, respectively may be added and used in conjunction with first and second switches, 220, 225, respectively, as discussed in more detail below.

Figure 13:
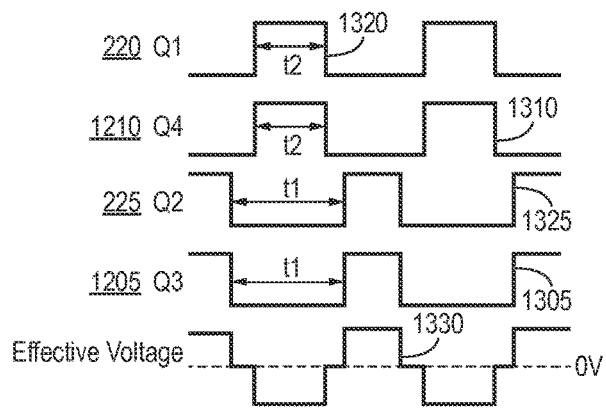
FIG. 13 is an example of a duty cycle algorithm that may be employed for the circuit described in FIG. 12 according to an embodiment of the invention.

Now referring to FIG. 13, in one embodiment a duty cycle algorithm may be employed for circuit 1200 described in FIG. 12 that uses dead time between first switch pair including first switch 220 and fourth switch 1210, and second switch pair including second switch 225 and third switch 1205 to modulate the average power delivered to antenna network 405. Waveform 1320 shows the gate voltage of first switch 220; waveform 1310 shows the gate voltage of fourth switch 1210; waveform 1325 shows the gate voltage of second switch 225; waveform 1305 shows the gate voltage of third switch 1205; and waveform 1330 shows the effective voltage applied to antenna network 405 (see FIG. 12).

Continuing to refer to FIG. 13, it can be seen that first switch 220 and fourth switch 1210 turn on and off synchronously. It can also be seen that second switch 225 and third switch 1205 turn on and off synchronously. Now referring to circuit 1200 in FIG. 12, it can be seen that when first switch 220 and fourth switch 1210 turn on, current may from full-bridge rectifier 1215, through first switch 220, through resonant circuit 250 and antenna network 405 circuit elements, and through fourth switch 1210. Conversely, when second switch 225 and third switch 1205 are on, a reverse voltage potential is created and current may from full-bridge rectifier 1215, through second switch 225, through resonant circuit 250 and antenna network 405 circuit elements, and through third switch 1205. By regulating the "on time" of the first switch pair and the second switch pair, the average power delivered to antenna network 405 can be controlled. The effective voltage of this operation is shown by line 1330 in FIG. 13.

Continuing to refer to FIG. 13, it can also be seen that the dead time, also called the off time of the first and the second switch pairs is when the opposite switch pair is turned on. For example, at the left most position in FIG. 13, second switch 225 and third switch 1205 are on, while first switch 220 and fourth switch 1210 are off. Progressing to the right, second switch 225 and third switch 1205 are off for time t1. During time t1, first switch pair including first switch 220 and fourth switch 1210 are turned on for time t2, then turned off. Subsequently, second switch pair, including second switch 225 and third switch 1205, is turned on, during the time first switch pair including first switch 220 and fourth switch 1210 are off. Thus, only one switch pair is on at a time, and the time the switch pair is on is the amount of time that the transmitter circuit has power applied to it, thus regulating the average power supplied to the circuit. By changing the duty cycle of each switch, the average AC voltage applied to the resonant network is modulated.

Figure 14A:
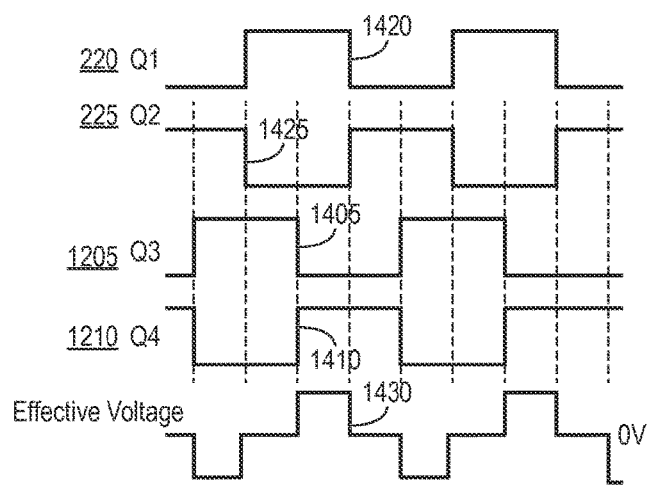
FIG. 14A is an example of a phase shift duty cycle algorithm that may be employed for the circuit described in FIG. 12 according to an embodiment of the invention.

Now referring to FIG. 14A, another embodiment employing a phase shift algorithm may be used to regulate the average power delivered to transmitter network 405 (see FIG. 12) is illustrated. Similar to the algorithm applied in FIG. 13, voltage will be applied to antenna network 405 only when first switch pair including first switch 220 and fourth switch 1210 are on or when second switch pair including second switch 225 and third switch 1205 are on are. Therefore, when first switch 220 and third switch 1205 are on, no power is transferred. Similarly, when second switch 225 and fourth switch 1210 are on, no power is transferred.

Further, in some embodiments, first switch 220 and second switch 225 may switch complementary, as may third switch 1205 and fourth switch 1210. More specifically, in some embodiments when first switch 220 is on, second switch 225 is off and similarly when third switch 1205 is on fourth switch 1210 may be off. Therefore, in one embodiment all switches may operate at a fixed 50% duty cycle (i.e., on for half the time and off for half the time). Instead of modulating the effective AC voltage applied to the resonant circuit by changing the duty cycle of each switch as discussed above, the AC voltage is modulated by changing the phase delay between the switches. Maximum overlap (zero phase delay) produces a maximum duty cycle and maximum power to antenna network 405. In one embodiment illustrated in FIG. 14A the duty cycle of the power applied to antenna network 405 may be controlled by modulating the phase delay between first switch 220 and third switch 1205.

In some embodiments a phase shifted control methodology may be easier than other control methodologies to maintain ZVS over large load and/or large power variations. More specifically, since each switch operates at fixed duty cycle of 50 percent it may be easier to implement ZVS techniques. Other embodiments may use a different duty cycle algorithm to control the power delivered to the transmitter network and are within the scope of this disclosure.

Figure 14B:
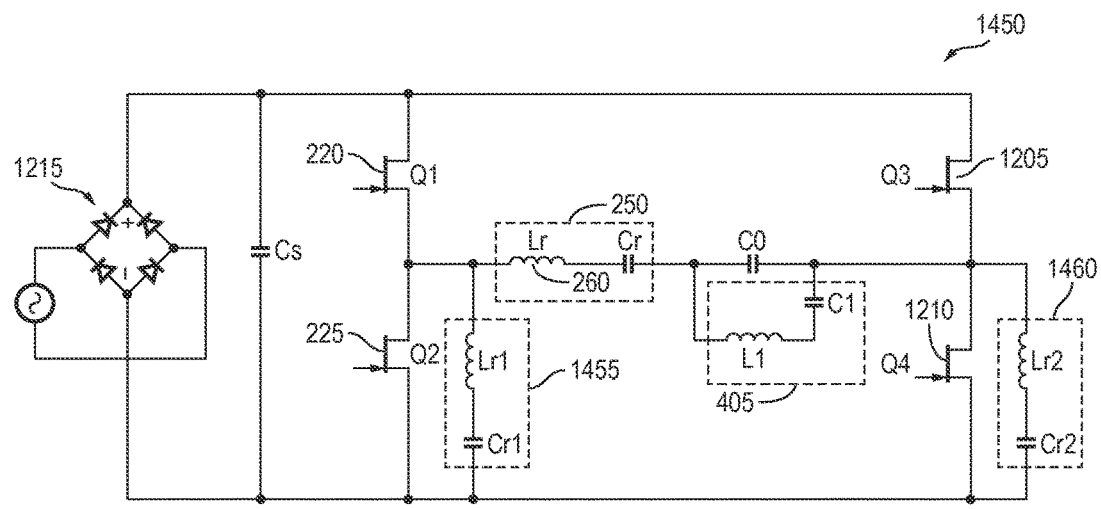
FIG. 14B is a schematic of a simplified single-stage antenna drive network circuit that uses a duty cycle algorithm and additional resonant circuits to achieve ZVS and regulate the average wireless transmitter output power according to an embodiment of the invention.
Figure 14C:
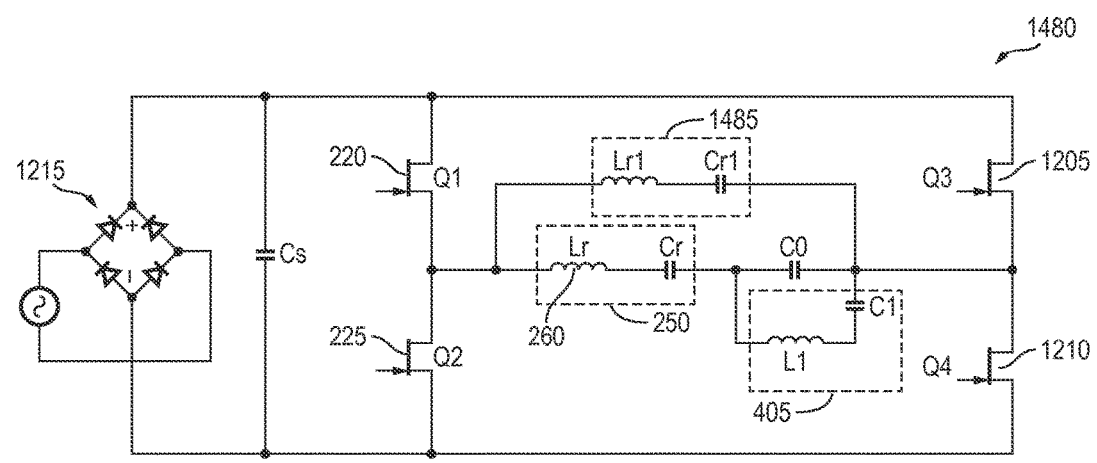
FIG. 14C is a schematic of a simplified single-stage antenna drive network circuit that uses a duty cycle algorithm and additional resonant circuits to achieve ZVS and regulate the average wireless transmitter output power according to an embodiment of the invention.

Now referring to FIGS. 14B and 14C, other embodiments may employ alternative circuits to achieve ZVS at light load conditions where the duty cycle may be small such that the switch pairs have minimal overlap. In such embodiments there may be inadequate energy stored in the resonant circuit inductor 260 to discharge the output capacitance (Coss) of switches 220, 225, 1205, 1210, so other circuit features may be added to overcome this issue.

For example, circuit 1450 in FIG. 14B, employs an alternative arrangement of resonant circuits that may improve ZVS at light load conditions. Circuit 1450 is similar to circuit 1200 in FIG. 12, however a second resonant circuit 1455 and a third resonant circuit 1460 have been added to each switching leg to generate additional inductive current to discharge the output capacitance (Coss) of switches of each corresponding leg. In some embodiments resonant circuits 1455, 1460 may be similar to resonant circuit 250, where their resonant frequency is lower than the switching frequency. Regardless of the load or phase delay of the switching pairs, each leg always switches at a 50 percent duty cycle, thus energizing second and third resonant circuits, 1455, 1460, respectively, regardless of the duty cycle control. Operation of the switches and the ZVS timing is the same as employed in circuit 1200 in FIG. 12, however circuit 1450 has additional load independent energy to ensure ZVS under all load conditions. Further, second and third resonant circuits, 1455, 1460, respectively, do not have an antenna network in series with them, so they may be designed with greater flexibility than resonant circuit 250.

Now referring to circuit 1480 in FIG. 14C, another alternative embodiment is illustrated that may improve ZVS at light load conditions. Circuit 1480 employs an additional resonant circuit 1485 in parallel to first resonant circuit 250. In some embodiments resonant circuit 1485 may be similar to resonant circuit 250, where their resonant frequency is lower than the switching frequency. In further embodiments the current flowing through resonant circuit 1485 may be load or duty cycle dependent, however it may still supply enough additional current to achieve ZVS. In further embodiments, operation of switches 220, 225, 1205, 1210 and ZVS timing may be similar to circuit 1200 in FIG. 12, however circuit 1480 may have additional load independent energy to ensure ZVS under all load conditions. Circuit 1480 may have fewer components than circuit 1450 in FIG. 14B. Resonant circuit 1485 may not have an antenna network in series with it, so it may be designed with greater flexibility than resonant circuit 250.

Figure 15:
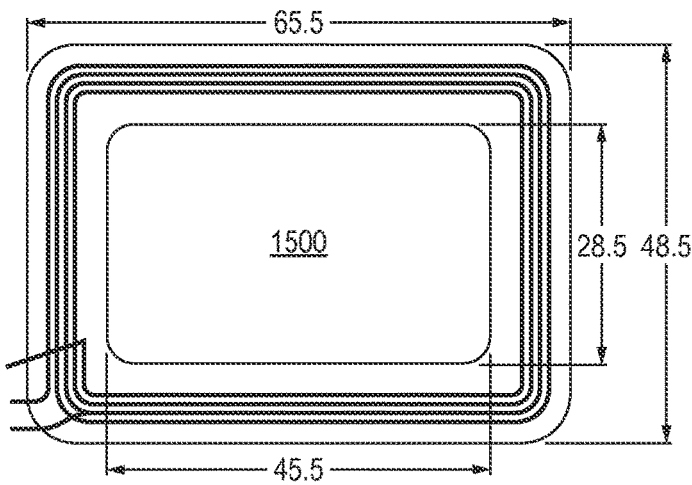
FIG. 15 is an example of an antenna coil according to an embodiment of the invention.

Now referring to FIG. 15, an example antenna coil 1500 of one embodiment is illustrated. Antenna coil 1500 may be used in an antenna network such as, for example antenna network 405 in FIG. 12, to transmit electrical power wirelessly to an electronic device. A receiver coil on the mobile device may be used to convert the wirelessly transferred power into electronic voltage and current. In one embodiment antenna coil 1500 is approximately 65.5 mm long by 48.5 mm wide, however the size of the antenna coil may vary greatly in other embodiments.

Figure 16:
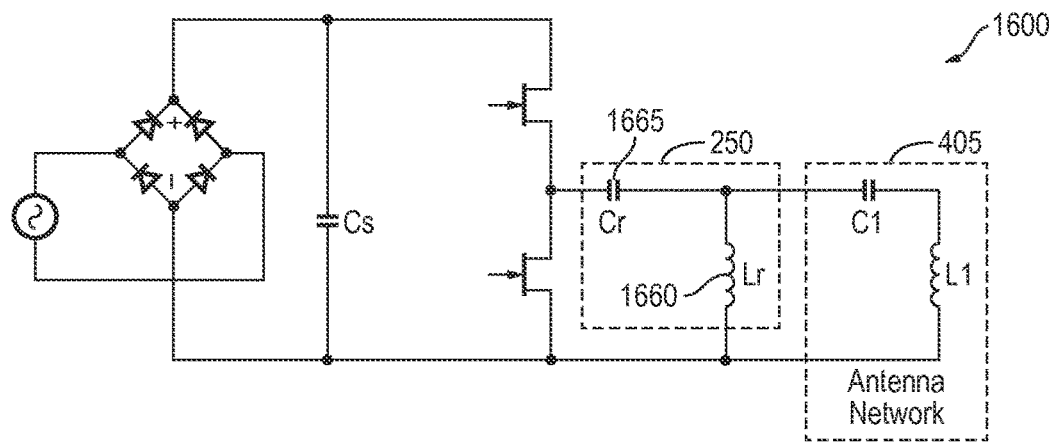
FIG. 16 is a schematic of a single-stage antenna drive circuit with a resonant circuit according to an embodiment of the invention.

Now referring to FIG. 16, a resonant half-bridge circuit 1600 that may be used in some embodiments to convert a high voltage to a low voltage for antenna network 405 is illustrated. Circuit 1600 is similar to circuit 400 illustrated in FIG. 4, above, however in circuit 1600 capacitor 410 (see FIG. 4) has been eliminated by carefully selecting resonant circuit 250 components inductor 1660 and capacitor 1665. Careful design and selection of inductor 1660 and capacitor 1665 may result in the appropriate AC voltage applied across antenna network 405 or it may match the antenna network specification so that the antenna network can be directly connected across inductor 1660 or capacitor 1665.

Figure 17:
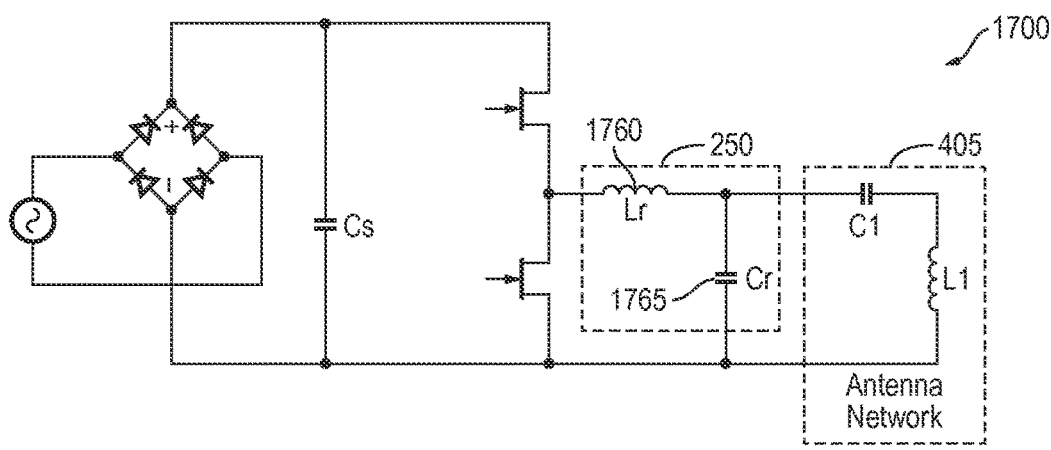
FIG. 17 is a schematic of a single-stage antenna drive circuit with a resonant circuit according to an embodiment of the invention.

Now referring to FIG. 17, a resonant half-bridge circuit 1700 that may be used in some embodiments to convert a high voltage to a low voltage for antenna network 405 is illustrated. Circuit 1700 is similar to circuit 500 illustrated in FIG. 5, above, however in circuit 1700 inductor 505 (see FIG. 5) has been eliminated by carefully selecting resonant circuit 250 components inductor 1760 and capacitor 1765. Careful design and selection of inductor 1760 and capacitor 1765 may result in the appropriate AC voltage applied across antenna network 405 or it may match the antenna network specification so that the antenna network can be directly connected across inductor 1760 or capacitor 1765.

Figure 18:
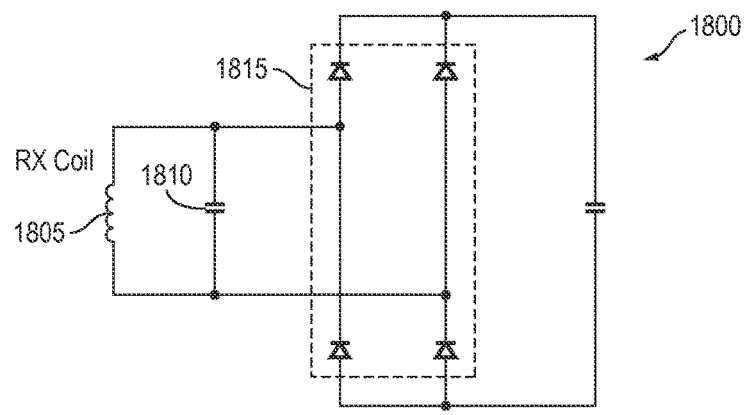
FIG. 18 is a schematic of a receiver network according to an embodiment of the invention.

Now referring to FIG. 18, one embodiment of a receiver network 1800 is illustrated. Receiver network 1800 may be located in an electronic device and may receive transmitted electromagnetic energy from an antenna network. Receiver network 1800 may convert the received electromagnetic energy into voltage and current that can be used to charge and/or power the electronic device.

In one embodiment, receiver coil 1805 is exposed to transmitted electromagnetic energy from a transmitter network as discussed above. Receiver coil 1805 coil may be used to generate an AC voltage within network 1800. In some embodiments, capacitor 1810 and receiver coil 1805 form a resonant tank circuit that may be tuned to the transmitter frequency to improve power transfer efficiency. In further embodiments, the coupled AC voltage may be converted to DC voltage through a full wave bridge rectifier 1815 made of four diodes. The DC voltage can be converted to other voltages to charge a battery or to power electronic circuits.

Figure 19:
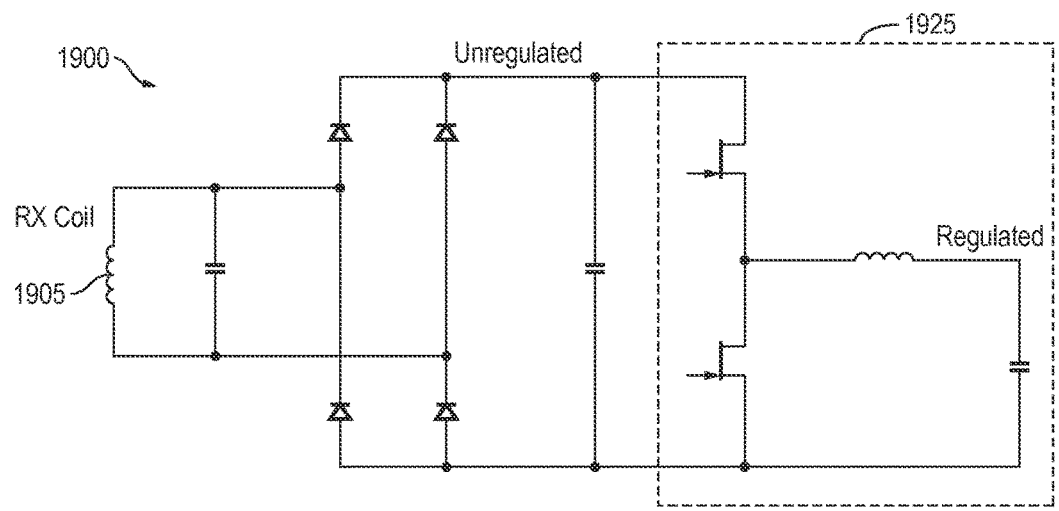
FIG. 19 is a schematic of the receiver network illustrated in FIG. 18 including a DC to DC converter according to an embodiment of the invention.

Now referring to circuit 1900 in FIG. 19, in one embodiment a DC to DC converter 1925 may be added to a receiver network to regulate its output voltage. In some embodiments, the coupled AC voltage through receiver coil 1905 may not be constant, and the voltage may change with factors such as magnetic field strength, distance between receiver and transmitter coils, load and coil positions, among other factors. Therefore, the rectified DC voltage may vary and be essentially unregulated. For example, in one embodiment the output DC voltage may vary from 5V to 25V. In some embodiments an unregulated DC output may be too high for the load, thus a circuit such as DC to DC converter 1925 may be used to regulate it.

Figure 20:
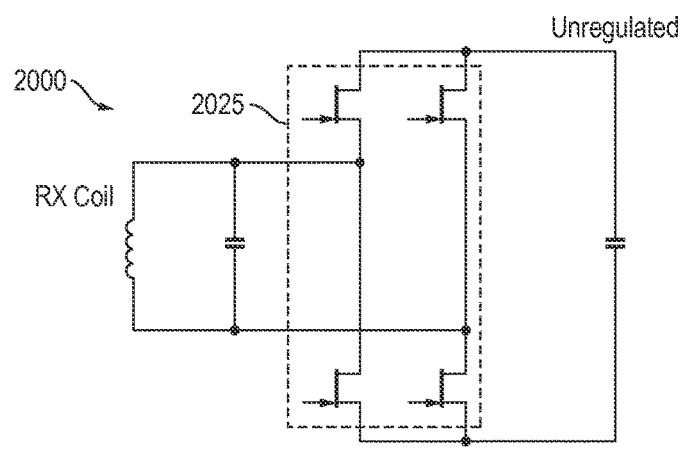
FIG. 20 is a schematic of receiver network with synchronous switches used in place of diodes for a bridge rectifier according to an embodiment of the invention.

Now referring to circuit 2000 illustrated in FIG. 20, some embodiments may improve the efficiency of a receiver network by replacing a diode bridge rectifier (e.g., rectifier 1815 in FIG. 18) with a synchronous switch set 2025 comprising four solid-state switches. The use of switch set 2025 with a low on resistance may reduce losses due to the comparatively larger voltage drop across the diodes in the diode bridge. In some embodiments the switches in switch set 2025 may turn on when current flows through their body diodes from the source to the drain, and turn off when current flowing from their source to their drain reduces to zero or the current direction is reversed, flowing from their drain to their source. In further embodiments, synchronous switch set 2025 can reduce two diode drops, (i.e., 1 V), which can improve efficiency by approximately 10% when the DC output is 10 V. However, in some embodiments a synchronous rectifier may still produce an unregulated DC output. If a regulated output voltage is required, such embodiments may use a DC/DC converter such as converter 1925 illustrated in FIG. 19.

Figure 21A:
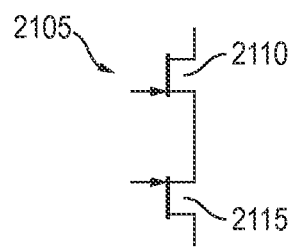
FIGS. 21A-21B are schematics of bidirectional switches according to embodiments of the invention.
Figure 21B:
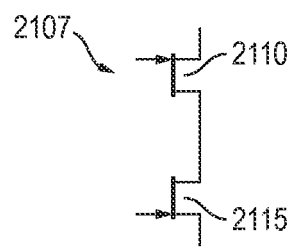

Now referring to FIGS. 21A and 21B, in some embodiments a receiver network may employ one or more bidirectional switches 2105, 2107, as discussed in more detail below. A bidirectional switch is a switch or switch combination that enables the conduction of current in either direction when in an on state and prevents the conduction of current in any direction when in an off state. In one embodiment, as illustrated in FIGS. 21A and 21B, a bidirectional switch 2105 may be made by connecting a first single switch 2110 and a second single switch 2115 back to back with source terminals in common. Further embodiments may make a bidirectional switch 2107 by connecting a first single switch 2110 and a second single switch 2115 back to back with drain terminals in common, as illustrated in FIG. 21B. In some embodiments one or more of switches 2105, 2107 may be silicon-based. In further embodiments, particularly when used in high frequency and/or high voltage applications, switches 2105, 2107 may be GaN-based.

Figure 22:
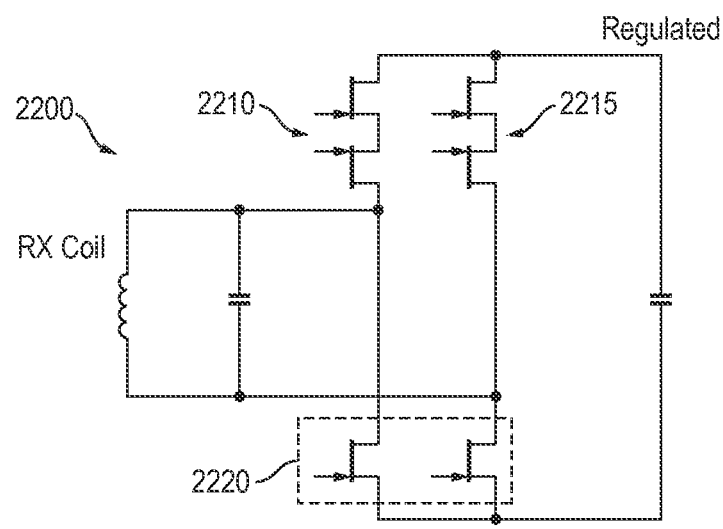
FIG. 22 is a schematic of receiver network having two bidirectional switches combined with a synchronous rectifier to regulate DC output according to an embodiment of the invention.

Now referring to FIG. 22, in some embodiments a receiver network circuit 2200 may have two bidirectional switches 2210, 2215 combined with a synchronous rectifier 2220 to regulate DC output. In one embodiment, when the output voltage drops below a set low voltage threshold, switches 2210, 2215 and 2220 may operate like a normal synchronous rectifier. However, when the output voltage rises above a set high voltage threshold, bidirectional switches 2210, 2215 may turn off, and block the AC coil voltage from reaching the output capacitor. Bidirectional switches 2210, 2215 may remain off until the DC output reduces below the set high voltage threshold, then the normal synchronous mode may be reengaged. This embodiment may remove the need to have a separate DC/DC converter, and may improve efficiency and save cost.

Figure 23:
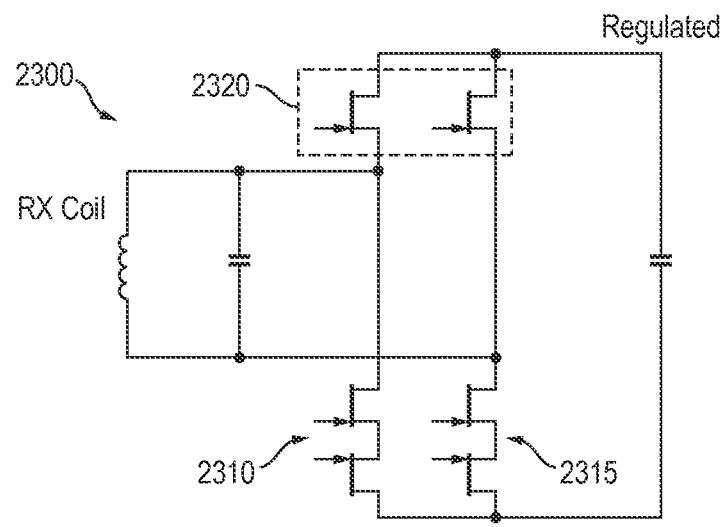
FIG. 23 is a schematic of receiver network having two bidirectional switches combined with a synchronous rectifier to regulate DC output according to an embodiment of the invention.
Figure 24:
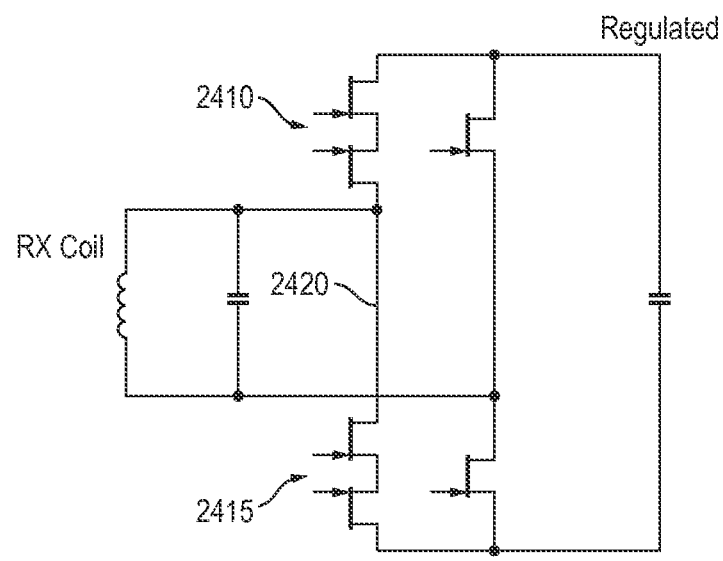
FIG. 24 is a schematic of receiver network having two bidirectional switches combined with a synchronous rectifier to regulate DC output according to an embodiment of the invention.

Receiver network circuit 2300 illustrated in FIG. 23 has bidirectional switches 2310, 2315 on the bottom portion of receiver network circuit 2300, as compared to circuit 2200 in FIG. 22 that has bidirectional switches 2210, 2215 on the top portion of the circuit. In further embodiments, as illustrated in FIG. 24, bidirectional switches 2410, 2415 may be implemented on a first leg 2420 of receiver network circuit 2400.

Figure 25:
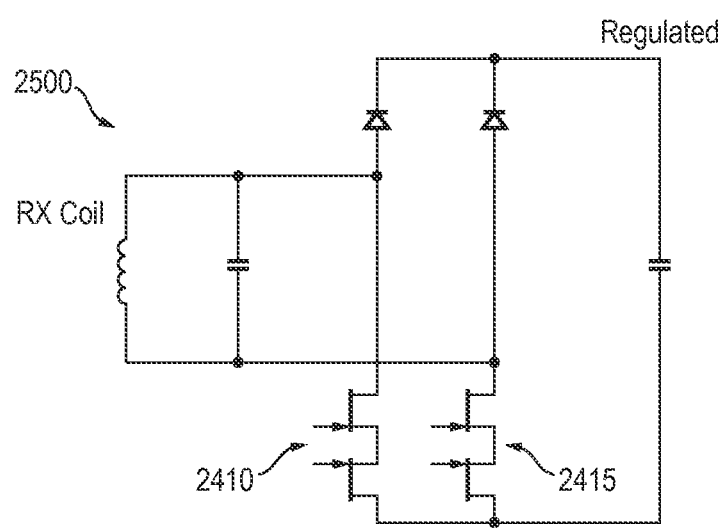
FIG. 25 is a schematic of receiver network having a single stage regulation architecture according to an embodiment of the invention.

Now referring to FIG. 25, in further embodiments a receiver network circuit 2500 may employ a single stage regulation architecture to regulate output voltage. Such embodiments may not employ a synchronous rectifier and may replace two of the four diodes typically used in a full bridge rectifier with bidirectional switches 2410, 2415. Bidirectional switches 2410, 2515 may enable or disable the rectifier on demand to control the output power and to regulate the DC voltage. Myriad other methods may be used for output power regulation and are within the scope of this disclosure.

Integration and Co-Packaging

Figure 26:
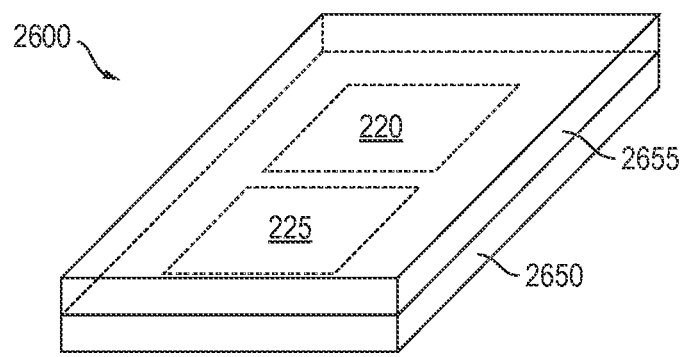
FIG. 26 is a simplified isometric rendering of co-packaged devices according to an embodiment of the invention.

Now referring to FIG. 26, in some embodiments one or more electronic components may be integrated within a single electronic package 2600 (i.e., co-packaged). In one embodiment a portion of half-bridge circuit similar to circuit 400 in FIG. 4 may be co-packaged by placing first switch 220 and second switch 225 in package 2600. In further embodiments first switch 220 and second switch 225 may each have external source, gate and drain connections. An external connection may be an electrical connection that is made outside of package 2600, such as a solder connection to another circuit board. In other embodiments, first switch 220 and second switch 225 may have external gate connections, however one or more of the source and drain connections may be inside package 2600, forming a switch node connection. In some embodiments, the switch node may also have an external connection.

In some embodiments electronic package 2600 may be what is known as an organic multi-chip module. An organic substrate 2650, such as, but not limited to a printed circuit board, may be used as a mount for the switches 220, 225 and other components and may also provide electrical interconnectivity between the devices within the package and/or between the devices and the system to which package 2600 is mounted. In some embodiments one or more devices may be attached to the substrate with an electrically conductive material such as, but not limited to, solder or electrically conductive epoxy. In some embodiments the electronic devices may be electrically connected to the substrate and/or each other with wire bonds, while in further embodiments flip-chip devices, conductive columns or other electrical interconnects may be used. An electrically insulative potting compound 2655 may be molded on top of the substrate and around the electrical devices to provide environmental protection.

In further embodiments, dies 220, 225 may each have a driver monolithically integrated on the die. That is, first switch 220 may have a first driver circuit disposed on a unitary monolithic die. Similarly, second switch 225 may have a second driver circuit disposed on a unitary monolithic die. In further embodiments, passive components such as resistors, capacitors, inductors and the like may also be mounted to substrate 2650. In yet further embodiments, additional active components may be mounted to substrate such as diodes, a controller die or other device.

In some embodiments, particularly in high frequency applications, co-packaging and monolithic integration may enable improved electrical performance through the elimination of packaging and component interconnect parasitics. All conductors and electrical components possess parasitic elements. For instance, a resistor is designed to possess resistance, but will also possess unwanted parasitic capacitance. Similarly, a conductor is designed to conduct an electrical signal, but will also possess unwanted parasitic resistance and inductance. Parasitic elements cause propagation delays and impedance mismatches which limit the operating frequency of the converter. Thus, the elimination and or minimization of conductors and interconnect structures between electronic components eliminates/minimizes parasitic elements that limit the maximum operating frequency of the converter.

Figure 27:
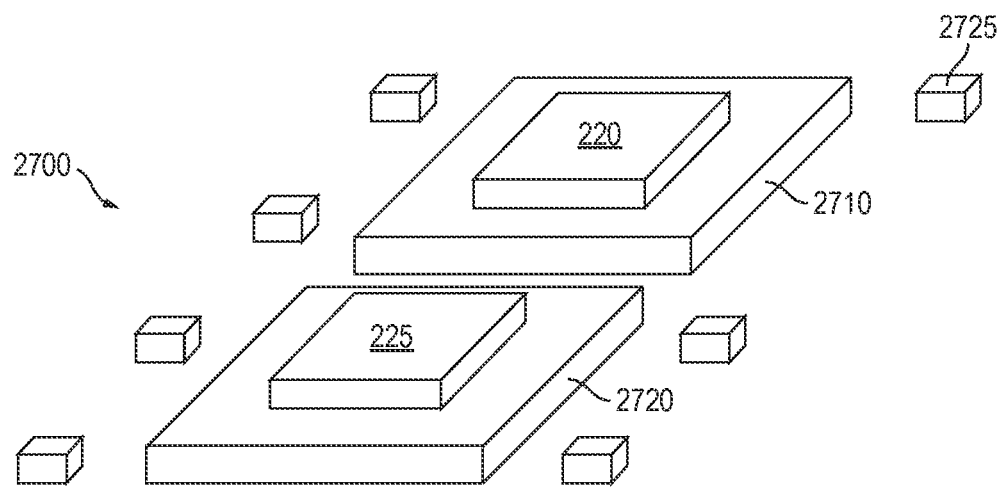
FIG. 27 is a simplified isometric rendering of co-packaged devices according to an embodiment of the invention.

Now referring to FIG. 27, first switch 220 and second switch 225 are shown in a different packaging configuration that may be called a leadless chip carrier or a quad flat no lead package 2700. First switch 220 and second switch 225 are mounted to first pad 2710 and second pad 2720, respectively, using methods as discussed above. Electrical connections may be made from first switch 220 and second switch 225 to first pads 2710, between dies, to second pad 2720 and/or peripheral connections 2725, as discussed above. First pad 2710, second pad 2720 and peripheral connections 2727 may be leadframe material that is over molded with an electrically insulative mold compound. First switch 220 and second switch 225 may have monolithically integrated driver circuits as discussed above. In further embodiments, other passive or active components may also be integrated into package 2700, as discussed above. In one embodiment a full-bridge circuit may be made by mounting two packages 2700 on a circuit board. In further embodiments, package 2600 (see FIG. 26) or package 2700 may contain four separate switches such that all the switches necessary for a full-bridge converter are within a single electronic package. In other embodiments a control die and other actives may also be integrated within package 2700.

In the foregoing specification, embodiments of the invention have been described with reference to numerous specific details that may vary from implementation to implementation. The specification and drawings are, accordingly, to be regarded in an illustrative rather than a restrictive sense. As an example, various embodiments may employ the same reference designation for circuit elements, however the circuit elements themselves may not be identical. One particular example is with regard to the antenna network. Both FIGS. 4 and 6 use the designation 405 for the antenna network, however that does not imply the antenna network in FIG. 4 is identical to the antenna network in FIG. 6, it merely illustrates that an antenna network is present in both embodiments. The sole and exclusive indicator of the scope of the invention, and what is intended by the applicants to be the scope of the invention, is the literal and equivalent scope of the set of claims that issue from this application, in the specific form in which such claims issue, including any subsequent correction. In addition, the scope of this disclosure is not limited to a particular method of implementation. That is, the circuits, the control algorithms and the packaging designs described herein are not intended to be limiting, but are rather illustrative examples.

What is claimed is:

1. A wireless power transmission circuit comprising:
   a voltage source having first and second output terminals;
   a first pair of complementary switches coupled in series and connected between the first and second output terminals, wherein a first switch node is positioned between the first pair of complementary switches;
   a second pair of complementary switches coupled in series and connected between the first and second output terminals, wherein a second switch node is positioned between the second pair of complementary switches;
   an antenna network coupled between the first switch node and the second switch node; and
   a resonant circuit coupled to the antenna network and configured to resonate at a frequency that is different than a resonant frequency of the antenna network to create out of phase voltage and current signals that enable one or more switches of the first pair of complementary switches to operate with zero voltage switching (ZVS);
   wherein power from the voltage source to the antenna network is regulated by changing a delay between an on-state of a solid-state switch of the first pair of complementary switches and an on-state of a solid-state switch of the second pair of complementary switches.

2. The wireless power transmission circuit of claim 1 wherein the first pair of complementary switches operate such that when a first switch of the first pair of complementary switches is off a second switch of the first pair of complementary switches is on and when the first switch of the first pair of complementary switches is on the second switch of the first pair of complementary switches is off.

3. The wireless power transmission circuit of claim 1 wherein the second pair of complementary switches operate such that when a first switch of the second pair of complementary switches is off a second switch of the second pair of complementary switches is on and when the first switch of the second pair of complementary switches is on the second switch of the second pair of complementary switches is off.

4. The wireless power transmission circuit of claim 1 wherein the first and second pairs of complementary switches operate with a fixed duty cycle.

5. The wireless power transmission circuit of claim 4 wherein the fixed duty cycle is fifty percent.

6. The wireless power transmission circuit of claim 1 wherein the resonant circuit is a first resonant circuit and a second resonant circuit is coupled between the first switch node and the second output terminal; and
   a third resonant circuit is coupled between the second switch node and the second output terminal.

7. The wireless power transmission circuit of claim 1 wherein the resonant circuit is coupled between the first switch node and the antenna network.

8. The wireless power transmission circuit of claim 1 wherein the first and second pairs of complementary switches are Gallium-Nitride based devices.

9. The wireless power transmission circuit of claim 1 wherein the first and second pairs of complementary switches operate with zero voltage switching.

10. A wireless power transmission circuit comprising:
    a voltage source having first and second output terminals;
    a first pair of switches coupled in series and connected between the first and second output terminals,
    a first switch node positioned between the first pair of switches;
    a second pair of switches coupled in series and connected between the first and second output terminals;
    a second switch node positioned between the second pair of switches;
    an antenna network coupled between the first switch node and the second switch node; and
    a resonant circuit coupled to the antenna network and configured to resonate at a frequency that is different than a resonant frequency of the antenna network to create out of phase voltage and current signals that enable one or more switches of the first pair of switches to operate with zero voltage switching (ZVS).

11. The wireless power transmission circuit of claim 10 wherein the first and second pairs of switches operate with a fixed duty cycle.

12. The wireless power transmission circuit of claim 11 wherein the fixed duty cycle is fifty percent.

13. The wireless power transmission circuit of claim 10 wherein the resonant circuit is a first resonant circuit and a second resonant circuit is coupled between the first switch node and the second output terminal; and
    a third resonant circuit is coupled between the second switch node and the second output terminal.

14. The wireless power transmission circuit of claim 10 wherein the resonant circuit is coupled between the first switch node and the antenna network.

15. The wireless power transmission circuit of claim 10 further comprising an AC voltage divider circuit coupled to the resonant circuit and configured to reduce an AC voltage supplied to the antenna network.

16. The wireless power transmission circuit of claim 15 further comprising an impedance matching circuit coupled to the AC voltage divider circuit and configured to match an impedance of the antenna network.

17. The wireless power transmission circuit of claim 10 wherein the first and second pairs of switches operate with zero voltage switching.

18. The wireless power transmission circuit of claim 10 wherein the first and second pairs of switches are Gallium-Nitride based devices.

* * * * *